(12) United States Patent
Muhlhoff et al.

(10) Patent No.: US 9,975,203 B2
(45) Date of Patent: May 22, 2018

(54) TIRE COMPRISING A HIGH-CONTRAST PATTERN AND RIBS FOR PROTECTING THE PATTERN

(75) Inventors: Olivier Muhlhoff, Clermont-Ferrand (FR); Jean-Claude Desvignes, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 826 days.

(21) Appl. No.: 14/126,811

(22) PCT Filed: May 31, 2012

(86) PCT No.: PCT/EP2012/060201
§ 371 (c)(1),
(2), (4) Date: Feb. 4, 2014

(87) PCT Pub. No.: WO2012/171802
PCT Pub. Date: Dec. 20, 2012

(65) Prior Publication Data
US 2014/0216622 A1 Aug. 7, 2014

(30) Foreign Application Priority Data
Jun. 15, 2011 (FR) ...................................... 11 55208

(51) Int. Cl.
*B60C 13/00* (2006.01)
*B60C 13/02* (2006.01)
(Continued)

(52) U.S. Cl.
CPC ........ *B23K 26/0093* (2013.01); *B23K 26/361* (2015.10); *B29C 33/424* (2013.01);
(Continued)

(58) Field of Classification Search
CPC ..... B60C 13/00; B60C 13/001; B60C 13/002; B60C 13/003; B60C 13/004;
(Continued)

(56) References Cited

U.S. PATENT DOCUMENTS

| 5,263,525 A | 11/1993 | Yamashita |
| 2010/0218866 A1* | 9/2010 | D'Harcourt ............. B60C 11/01 152/209.16 |

FOREIGN PATENT DOCUMENTS

| EP | 0522781 A1 | 1/1993 |
| EP | 0755810 A2 | 1/1997 |
| WO | 2011036061 A1 | 3/2011 |

OTHER PUBLICATIONS

PCT/EP2012/060201—International Search Report (English translation included), dated Jul. 11, 2012, 2 pages.

* cited by examiner

*Primary Examiner* — Justin R Fischer
(74) *Attorney, Agent, or Firm* — Dickinson Wright PLLC

(57) ABSTRACT

The invention relates to a tire made of rubbery material comprising a sidewall on which there is formed at least one pattern that contrasts with this sidewall. The pattern comprises a plurality of strands distributed through the pattern with a density of at least five strands per square millimeter (mm²), each strand having a mean cross section of between 0.003 mm² and 0.06 mm². The tire also comprises on the said sidewall at least two ribs that pass through the pattern and between which strands of the pattern are present, the said ribs being distant from one another by at most 10 mm, each rib having a height of at least 0.25 mm and a mean width of at least 0.20 mm, the said pattern following the relief formed by the ribs.

7 Claims, 3 Drawing Sheets

(51) Int. Cl.
- *B23K 26/00* (2014.01)
- *B29C 33/42* (2006.01)
- *B29D 30/06* (2006.01)
- *B23K 26/361* (2014.01)
- *B29D 30/72* (2006.01)

(52) U.S. Cl.
CPC ........ B29D 30/0606 (2013.01); B60C 13/001 (2013.01); B60C 13/02 (2013.01); *B29D 2030/0612* (2013.01); *B29D 2030/0616* (2013.01); *B29D 2030/726* (2013.01)

(58) Field of Classification Search
CPC ..... B60C 13/009; B60C 13/02; B60C 13/023; B60C 13/04; B60C 15/024
See application file for complete search history.

TIRE COMPRISING A HIGH-CONTRAST PATTERN AND RIBS FOR PROTECTING THE PATTERN

This application claims benefit of the filing date of PCT/EP2012/060201, filed May 31, 2012, which claims the benefit of FR1155208, filed Jun. 15, 2011, the entire contents of each of which are incorporated herein by reference for all purposes.

FIELD

Disclosed herein is a tire for a motor vehicle having a high-contrast pattern and also relates to a mold for molding and vulcanizing the said tire and to a method for manufacturing this mold.

DESCRIPTION OF RELATED ART

The tire sidewalls display a great many patterns intended on the one hand to provide technical and legal information and, on the other hand, to allow the consumers to discern the origin of the product.

Attempts are continually being made to improve the visibility and legibility of these patterns on tire sidewalls.

Document WO2007/045425 describes a high-contrast pattern comprising a plurality of strands projecting from a surface of the tire. "Strand" here means a filiform element the height of which is at least equal to twice the diameter of a disc of the same surface area as the mean cross section of the strand.

The effect of these strands is to "trap" the incident rays of light that encounter the pattern. This allows the pattern to be given a blacker appearance by comparison with the rest of the tire sidewall. The strands also make it possible to obtain a particularly pleasant feel, of the "velour" type.

However, a pattern comprising such strands may be relatively fragile when faced with certain forms of mechanical attack, such as kerbing in which it is rubbed against a kerb. Under the effect of this rubbing, the strands of the pattern may detach from the tire.

In order to improve the mechanical strength of the pattern, it has been proposed that use be made of strips in place of strands. The strips are elongate strands which have a length at least equal to twice their height. Although the strips are better able to withstand the mechanical loadings encountered during kerbing, the pattern is still relatively fragile and the difference in contrast between the pattern and the rest of the sidewall fades fairly rapidly by comparison with the service life of the tire.

There is therefore a need to offer a high-contrast pattern which exhibits a more durable contrast with a sidewall of the tire.

Definitions

A "rubbery material" means a diene elastomer, namely, in the known way, an elastomer derived at least in part (i.e. homopolymer or a copolymer) from diene monomers (monomers bearing two carbon-carbon double bonds, conjugated or otherwise).

A "tire" means all types of elastic tire whether or not subjected to an internal pressure.

The "sidewall of a tire" means a lateral part of the tire positioned between the tread of the tire and a bead of this tire.

The "cross section" of a strand means a surface obtained by cutting the strand along a plane perpendicular to the axis of revolution of this strand.

The "mean cross section" of a strand means the mean of the cross sections measured at regular intervals from the root of the strand to the tip.

A "mold" means a collection of separate elements which, when brought closer together, are able to delimit a toroidal molding cavity.

A "striation" in a mold means a cut extending into the depth of the mold and able to mold a rib in a tire at the time of molding.

An "incision" here means a narrow striation able to mold a strip on a tire during molding.

A "cavity" means a cutout able to mold a strand on a tire during molding.

A "radial direction" means any direction perpendicular to the axis of rotation of the tire.

SUMMARY

Disclosed herein is a tire made of rubbery material comprising a sidewall on which there is formed at least one pattern that contrasts with this sidewall. The pattern comprises a plurality of strands distributed through the pattern with a density of at least five strands per square millimeter ($mm^2$), each strand having a mean cross section of between 0.003 $mm^2$ and 0.06 $mm^2$ The tire comprises on the sidewall at least two ribs that pass through the pattern and between which strands of the pattern are present, the said ribs being distant from one another by at most 10 mm, each rib having a height of at least 0.25 mm and a mean width of at least 0.20 mm. The said pattern follows the relief formed by the ribs.

The disclosure herein thus proposes providing on the sidewall of the tire a plurality of ribs that protect the strands. Strands of the pattern are then arranged between the ribs. During kerbing, the contact pressure applied by the kerb to the pattern will be borne mainly by the ribs, which are more rigid than the strands. During kerbing, the strands of the pattern will flex and bear only a small part of the contact pressure applied by the kerb. The detachment of the strands from the tire is therefore limited.

As the tire is successively kerbed, the ribs will gradually wear away. As long as even partially worn ribs remain, the strands of the pattern which are arranged between the ribs are protected by these ribs.

The disclosure herein therefore makes it possible to enhance the robustness of the pattern. Thus, a more durable contrast between the pattern and the rest of the sidewall is guaranteed.

The disclosure herein also relates to a tire made of rubbery material comprising a sidewall on which there is formed at least one pattern that contrasts with this sidewall. The pattern is provided with a plurality of substantially mutually parallel strips, the spacing of the strips in the pattern being at most equal to 0.5 mm, each strip having a mean width of between 0.03 mm and 0.10 mm. The tire comprises on the said sidewall at least two ribs that pass through the pattern and between which strips of the pattern are present, the said ribs being distant from one another by at most 10 mm, each rib having a height of at least 0.25 mm and a mean width of at least 0.20 mm. The pattern follows the relief formed by the ribs.

The disclosure herein thus proposes providing on the side wall of the tire a plurality of ribs that protect the strips. Strips of the pattern are then arranged between the ribs. During kerbing, the contact pressure applied by the kerb to the pattern will be borne mainly by the ribs, which are more rigid than the strips. During kerbing, the strips of the pattern will flex and bear only a small part of the contact pressure applied by the kerb. Detachment of the strips from the tire is therefore limited.

As the tire is successively kerbed, the ribs will gradually wear away. As long as even partially worn ribs remain, the strips of the pattern which are arranged between the ribs are protected by these ribs.

The disclosure herein therefore makes it possible to enhance the robustness of the pattern. Thus, a more durable contrast between the pattern and the rest of the sidewall is guaranteed.

In an alternative form of embodiment, ends of strands of the pattern or respectively of strips of the pattern extend heightwise beyond the ribs.

Thus the contrast between the pattern and the rest of the sidewall of the tire is further improved.

In an alternative form of embodiment, the ribs have inclined lateral walls which, in terms of absolute value, make an angle of between 30° and 60° with a direction perpendicular to the sidewall, and strands of the pattern or respectively strips of the pattern project from these lateral walls mainly in the direction perpendicular to the sidewall.

Thus, even if the surface on which strands or, respectively, strips, project is inclined with respect to the sidewall, these strands or, respectively, these strips can assuredly remain directed perpendicular to the sidewall. The ability of these strands or, respectively, of these strips, to trap the incident rays of light is thus maintained. This ability to trap the incident rays of light would be more limited if the strands or, respectively, the strips, were for example to run perpendicular to the inclined walls of the ribs because in this configuration the strands or, respectively, the strips would have a greater surface area for reflecting the incident rays of light. The pattern would therefore be less of a contrast against the rest of the sidewall.

Furthermore, with an angle other than 90° between the direction in which the strands or, respectively, the strips, extend and the inclined walls of the ribs, the surface area for attachment of these strands or, respectively, these strips, to the walls of the ribs is increased by comparison with instances in which the angle between the strands or, respectively, the strips and the inclined walls is equal to 90°. Thus, the base of the strands or, respectively, of the strips, becomes more rigid and they become less easy to detach from the tire.

In an alternative form of embodiment, the ribs are oriented in a radial direction on the sidewall, i.e. each rib is contained in a plane passing through the axis of rotation of the tire.

When the tire is kerbed, the forces of the sidewall rubbing against the kerb are directed predominantly in a radial direction. By orienting the ribs in this radial direction, the ability of these ribs to bear the kerbing forces is optimized and the strands of the pattern, or, respectively, the strips of the pattern, are better protected.

Another embodiment relates to a mold for molding and vulcanizing a tire comprising a shell for molding a sidewall of a tire. The shell comprises a marking for molding a pattern that contrasts with the sidewall of the tire. This marking comprises a plurality of cavities, the said cavities being distributed through the marking at a density of at least 5 cavities per square millimeter ($mm^2$), each cavity having a mean cross section of between 0.003 $mm^2$ and 0.06 $mm^2$. The shell comprises at least two striations passing through the marking and between which cavities are present, these at least two striations being distant from one another by at most 10 mm, each striation having a depth of at least 0.25 mm and a mean width of at least 0.20 mm. The marking follows the relief formed by the striations.

The disclosure herein also relates to a mold comprising a marking formed by a plurality of substantially mutually parallel incisions, the spacing of the incisions in the marking being at most equal to 0.5 mm, each incision having a mean width of between 0.03 mm and 0.10 mm. The shell of the mold also comprises at least two striations passing through the marking and between which incisions are present, these at least two striations being distant from one another by at most 10 mm, each striation having a depth of at least 0.25 mm and a mean width of at least 0.20 mm. The marking follows the relief formed by the striations.

Another embodiment relates to a method of manufacturing a mold comprising a shell for molding a sidewall of a tire. The method of manufacture involves a step of producing a plurality of striations in part of the shell and a step of laser etching a plurality of cavities or a plurality of incisions in all or part of the striated part of the shell in order to form a marking.

In an alternative form of embodiment, the striations are created by knurling.

Striations are thus produced on a shell of a mold in a simple and practical way, these striations being able to mold ribs on a sidewall of a tire.

BRIEF DESCRIPTION OF THE FIGURES

Other features and advantages of the invention will become apparent from the following description given by way of non-limiting example, with reference to the attached drawings in which.

In the description which will follow, elements which are substantially identical or similar will be denoted by the same references.

DETAILED DESCRIPTION OF SPECIFIC EMBODIMENTS

Figure 1:
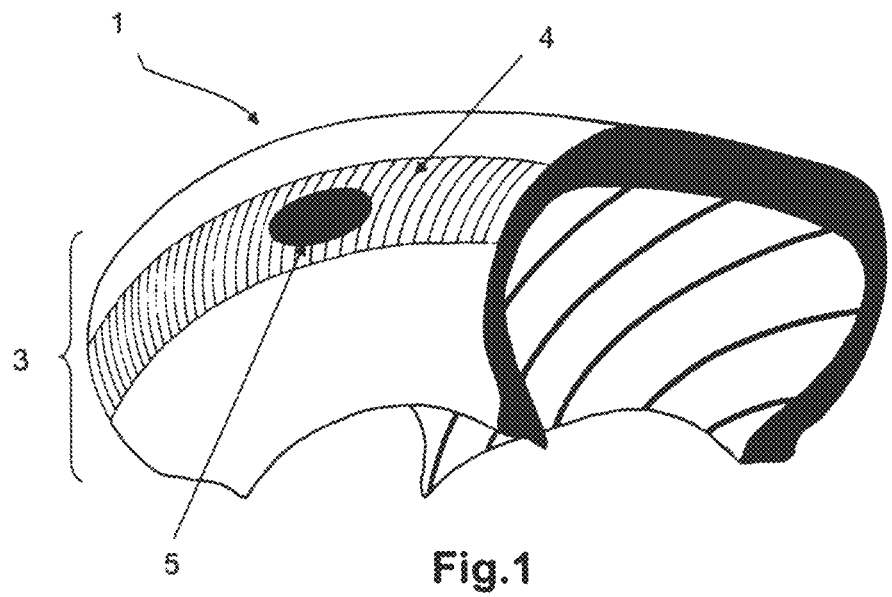
FIG. 1 schematically depicts a sidewall of a tire and a pattern that contrasts against this sidewall.

FIG. 1 is a partial view of a tire 1 according to embodiments of the invention. More specifically, FIG. 1 depicts a sidewall 3 of a tire. Visible on the sidewall of the tire are a plurality of mutually parallel ribs 4 and a pattern 5. A "rib" means an additional thickness projecting from the sidewall of the tire and the length of which is at least equal to twice its height.

The ribs 4 here are oriented on the sidewall in a radial direction.

The sidewall 3 has a smooth overall surface finish giving it a great ability to reflect the incident rays of light. Thus, under common brightness conditions, the sidewall will be perceived by an observer to be shiny overall.

The pattern 5 for its part has a black and matt appearance contrasting with the sidewall 3.

Figure 2:
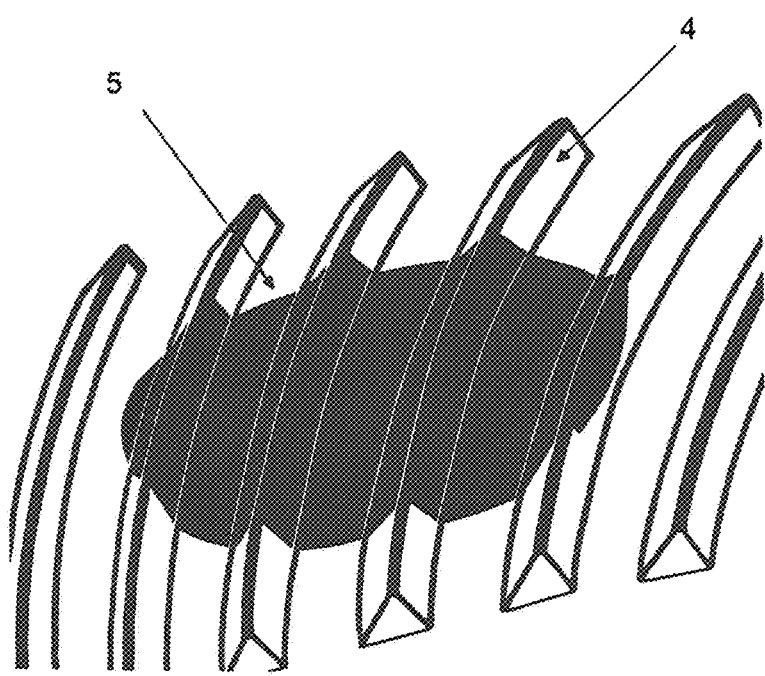
FIG. 2 depicts a detailed view of the pattern of FIG. 1.

FIG. 2 is an enlargement of the pattern of FIG. 1. This FIG. 2 clearly shows ribs 4 passing through the pattern 5.

"Ribs passing through the pattern" means that these ribs extend inside the pattern. The pattern 5 will therefore follow the relief formed by the ribs.

In the case of FIG. 2 the ribs are not limited to the pattern but extend beyond this pattern. As an alternative, it is possible to plan for the ribs to extend only inside the pattern and not to extend beyond this pattern.

It will be noted that the ribs here are parallel and the distance between two adjacent ribs is at most equal to 10 mm. As an alternative, the ribs are not parallel and the ribs may intersect each other inside the pattern. However, it is important that the distance between the ribs inside the pattern remains less than or equal to 10 mm.

Figure 3:
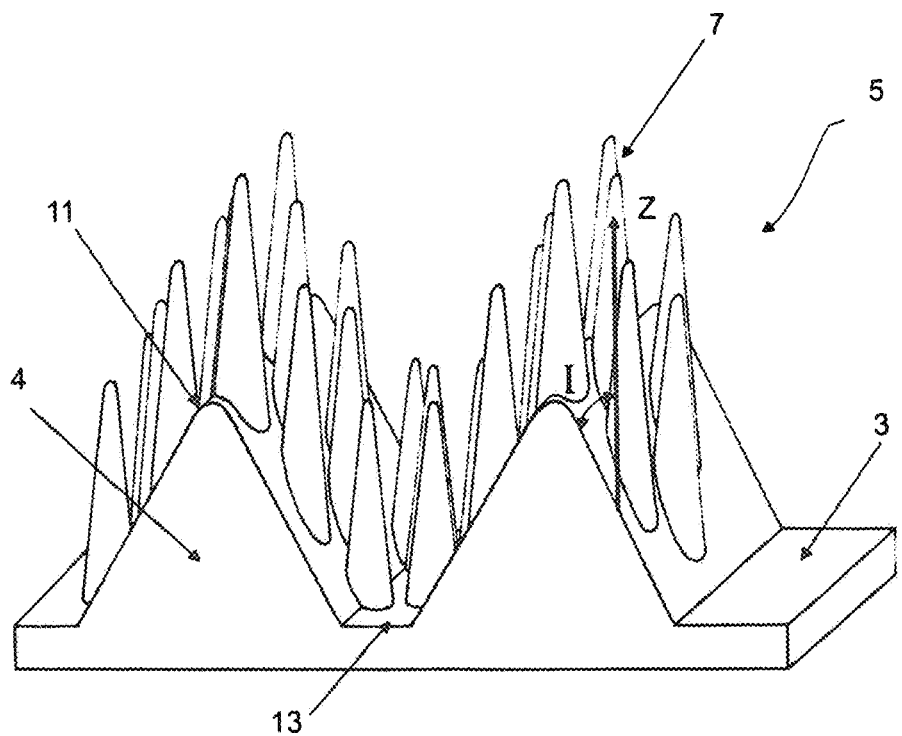
FIG. 3 depicts a perspective view of a first embodiment of the pattern of FIG. 1.

FIG. 3 is a perspective view of a first embodiment of the pattern 5 of FIG. 1.

In this embodiment, the pattern 5 is formed by a plurality of strands 7. Some of these strands extend between two tops 11 of two adjacent ribs 4. More specifically, strands cover a residual area 13 delimited by bases of the two adjacent ribs. Strands also cover the lateral walls of the ribs. Specifically, each rib has two lateral walls extending one on each side of their top 11. The lateral walls of the ribs 4 are, for example, inclined by an angle $\alpha$ which, in terms of absolute value, is between 30° and 60° to a direction Z perpendicular to the sidewall. Thus, the walls of the ribs when not covered with strands have a low ability to "trap" the incident rays of light. Thus, when the ribs extend all around the circumference of the tire, as they do in the example of FIG. 1, the pattern can be sure to contrast markedly with the sidewall and particularly with those zones of the sidewall which are covered by these ribs.

It will be noted that the height of the strands in the pattern is at least equal to 0.1 mm and that the height of the ribs in the pattern is between 0.25 mm and 1 mm. Depending on the heights selected for the strands and the ribs, and depending on the position of the strands with respect to the tops of the ribs, it is possible for ends of strands to extend beyond the tops of these ribs.

It will also be noted that in this instance the strands have a conical overall shape.

Figure 4:
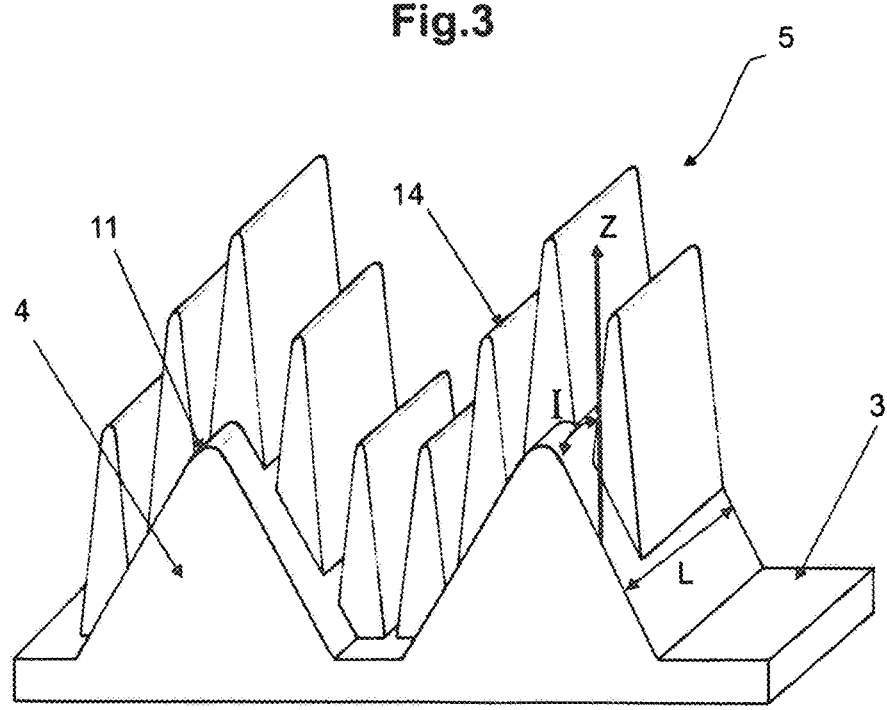
FIG. 4 depicts a perspective view of a second embodiment of the pattern of FIG. 1.

FIG. 4 is a perspective view of a second embodiment of the pattern 5 of FIG. 1.

In this embodiment, the strands of the pattern are replaced by strips 14 the mean width of which is less than the mean width of the ribs 4. The mean width of the strips in the pattern is thus between 0.03 and 0.10 mm and the mean width of the ribs in the pattern is at least equal to 0.20 mm. The "mean width" of a rib or of a strand, respectively, means the mean of the widths measured at regular intervals from the root of the rib, or of the strand respectively, to the tip, the width of a rib or, respectively, of a strip, corresponding to the distance measured between two lateral walls of this rib or of this strip respectively.

In addition, the height of the strips in the pattern is at least equal to 0.1 mm and the height of the ribs in the pattern is between 0.25 mm and 1 mm.

The strips are depicted here as being parallel to the ribs. As an alternative, the strips may make a non-zero angle with the direction in which the ribs extend. For example, the strips may be orthogonal to the direction in which these ribs extend.

Figure 5:
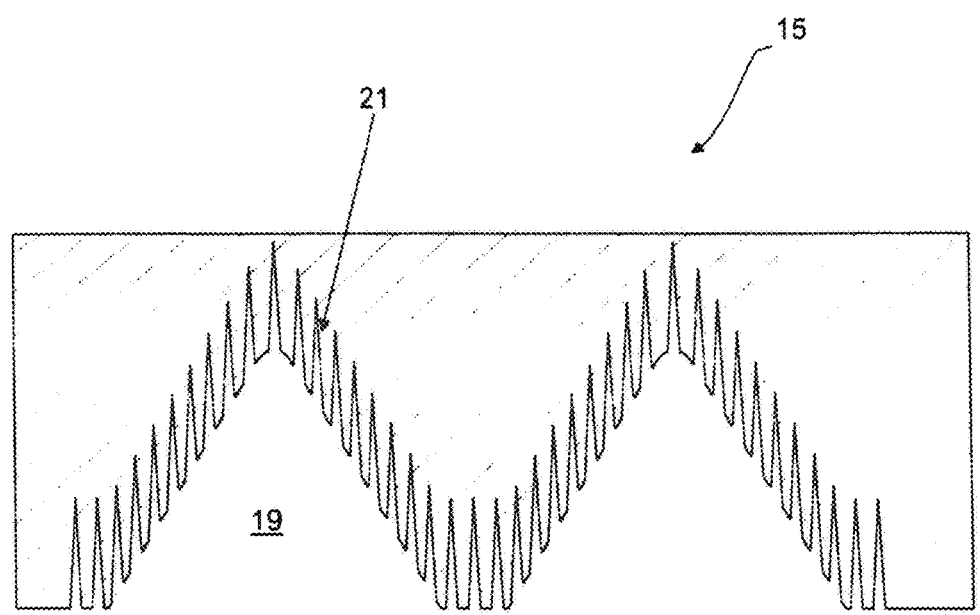
FIG. 5 depicts a view in cross section of part of a mold able to mold the pattern of FIG. 1.

FIG. 5 is view in cross section of part of a mold capable of molding the pattern 4 of FIG. 1. More particularly, this part of the mold corresponds to part of a shell 15 able to mold the sidewall of a tire.

The shell 15 comprises a surface for molding a plurality of striations 19. The striations 19 are able to mold ribs of the pattern 5. Each striation 19 extends into the depth of the shell. The shell 15 also comprises a set of cutouts 21 opening onto the molding surface between two adjacent striations 19. The cutouts 21 are, for example, cavities able to mold the strands of the pattern 5 of FIG. 3. These cavities may therefore have a conical overall shape.

As an alternative, the cutouts 21 are incisions able to mold the strips of the pattern 5 of FIG. 4.

Another embodiment relates to a method of manufacturing the shell in which method the striations 19 are created before the cutouts 21. More specifically, the striations 19 may be created mechanically by the removal of material, for example during a milling operation. As an alternative, the striations 19 are formed by deforming the material during a knurling operation. The striations thus formed by knurling have a depth of between 0.25 and 0.3 mm and a spacing of between 0.7 and 10 mm.

The cutouts 21 are created by laser etching. More specifically, the cutouts 21 are produced using a laser in successive passes, each pass having the effect of eroding the mold metal over a given surface and to a given depth. By way of example, a pulsed laser of the IPG make with a power of 50 W is used to form these cutouts. With such a laser etching operation it is possible to create a marking in the shell which follows the relief formed by the striations 19.

The invention is not restricted to the examples described and depicted and various modifications can be made thereto without departing from its scope.

For example, it is possible for the bases of the ribs to be in contact with one another. If they are, there are no residual surfaces between the ribs. The strands of the pattern or, respectively, the strips of the pattern, present between the ribs then project only from the walls of the ribs.

The invention claimed is:

1. A tire made of rubbery material comprising a sidewall on which there is formed at least one pattern that contrasts with the said sidewall, the said pattern comprising a plurality of strands distributed through the pattern with a density of at least five strands per square millimeter (mm2), each strand having a mean cross section of between 0.003 $mm^2$ and 0.06 $mm^2$, wherein the tire comprises on the said sidewall at least two ribs that pass through the pattern and between which strands of the pattern are present, the said ribs being distant from one another by at most 10 mm, each rib having a height of at least 0.25 mm and a mean width of at least 0.20 mm, the said pattern following a relief formed by the ribs,
   wherein the ribs have inclined lateral walls which, in terms of absolute value, make an angle ($\alpha$) of between 30° and 60° with a direct on (Z) perpendicular to the sidewall,
   wherein the plurality of strands consist of at least three types:
      the first type being defined as strands between the at least two ribs,
      the second type being defined as strands disposed on the inclined lateral walls, and
      the third type being defined as strands on a top portion of the at least two ribs,
   each of the first type, the second type, and the third type extend in a direction perpendicular to the sidewall.

2. The tire according to claim 1, wherein ends of strands of the pattern extend heightwise beyond the ribs.

3. The tire according to claim 1, wherein the ribs are oriented in a radial direction on the sidewall.

4. The tire according to claim 1, wherein some of the at least five strands are disposed on a surface of the ribs of the at least the two side walls.

5. A tire made of rubbery material comprising a sidewall on which there is formed at least one pattern that contrasts with the said sidewall, the said pattern being provided with a plurality of substantially mutually parallel strips, the spacing of the strips in the pattern being at most equal to 0.5 mm, each strip having a mean width of between 0.03 mm and 0.10 mm, wherein the tire comprises on the said sidewall at least two ribs that pass through the pattern and between which strips of the pattern are present, the said ribs being distant from one another by at most 10 mm, each rib having a height of at least 0.25 mm and a mean width of at least 0.20 mm, the said pattern following the a formed by the ribs,
- wherein the ribs have inclined lateral walls which, in terms of absolute value, make an angle ($\alpha$) of between 30° and 60° with a direct on (Z) perpendicular to the sidewall,
- wherein the plurality of substantially mutually parallel strips consist of at least three types:
  - the first type being defined as mutually parallel strips between the at least two ribs,
  - the second type being defined as mutually parallel strips disposed on the inclined lateral walls, and
  - the third type being defined as s mutually parallel strips on a top portion of the at least two ribs,
- each of the first type, the second type, and the third type extend in a direction perpendicular to the sidewall.

6. The tire according to claim 5, wherein ends of strips of the pattern extend heightwise beyond the ribs.

7. The tire according to claim 5, wherein some of the plurality of substantially mutually parallel strips are disposed on a surface of the ribs of the at least the two side walls.

* * * * *